April 26, 1932. P. MATTLER 1,855,481
FASTENER INSERTING MACHINE
Filed July 12, 1928
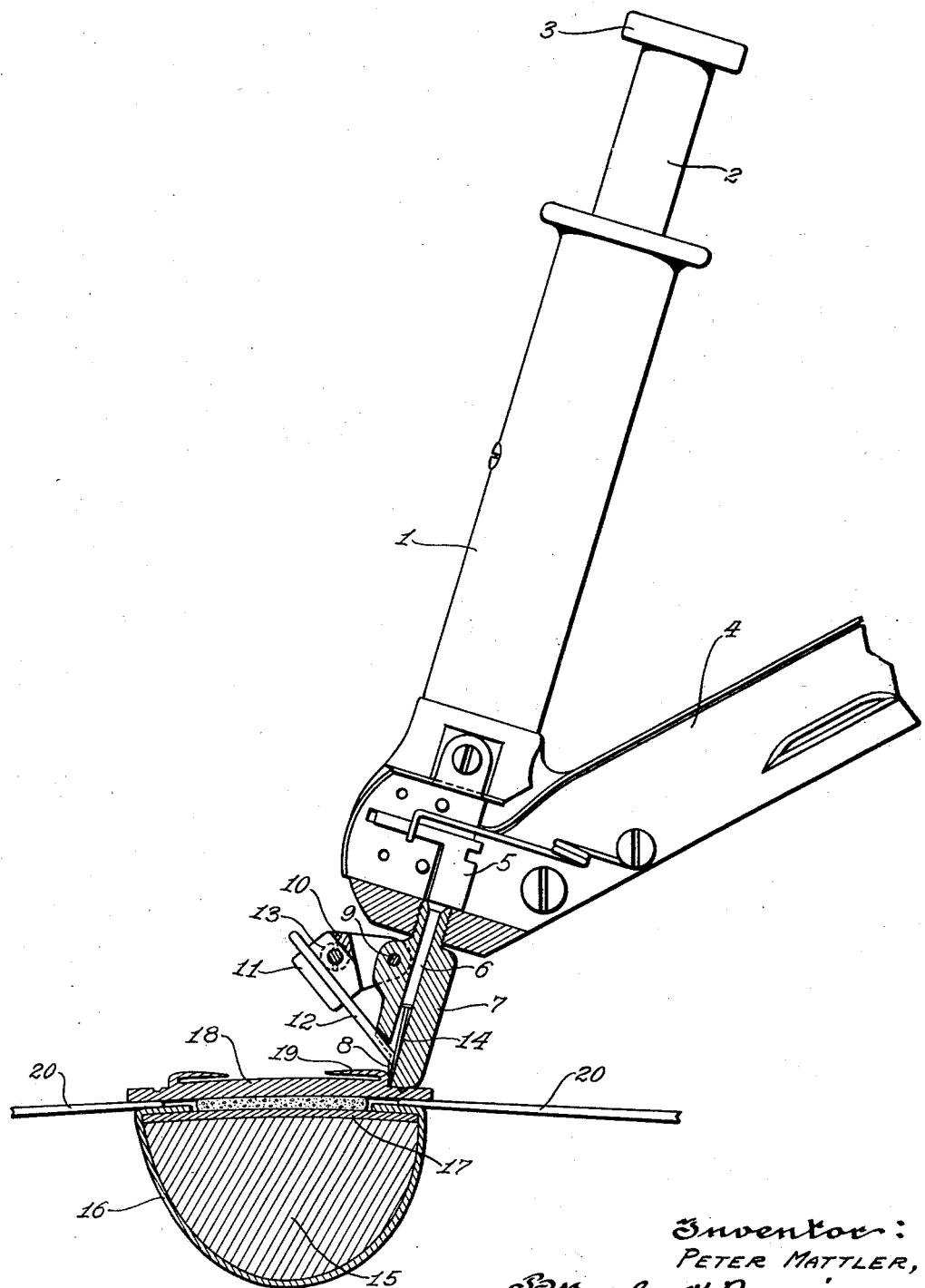
Inventor:
PETER MATTLER,
By john W Burridge
His Attorney.

Patented Apr. 26, 1932

1,855,481

UNITED STATES PATENT OFFICE

PETER MATTLER, OF ST. LOUIS, MISSOURI, ASSIGNOR TO JOHNSON-STEPHENS & SHINKLE SHOE COMPANY, OF ST. LOUIS, MISSOURI, A CORPORATION OF MISSOURI

FASTENER INSERTING MACHINE

Application filed July 12, 1928. Serial No. 292,145.

This invention relates to fastener inserting machines and more particularly to the throat construction of such machines.

In certain classes of work, it is necessary to drive a fastener partially, so as to leave the head thereof projecting. In other classes of work, for instance in the process of shoe manufacture as described in Patent No. 1,602,368, October 5, 1926, it is necessary to drive the fastener close to a shoulder, such as may be formed by the turned-back channel lip of a shoe sole. In such a case, the throat must be cut away to permit the fastener to be so driven. Since these fasteners are, however, soft and not of great stability, they are liable to become bent unless properly supported during the driving operation.

One of the objects of this invention, therefore, is to provide a fastener inserting machine, in which the throat is so constructed as to not only provide a gauge, but in which means is provided for guiding the fastener during its passage into the work.

Another object is to provide a throat and fastener guiding means associated therewith, which is simple in construction, effective in its action and economical to manufacture.

Further objects will appear from the detail description, taken in connection with the accompanying drawing, in which—

The figure is an elevation partly in section, showing the fastener inserting machine embodying this invention and showing also one of its uses.

Referring to the accompanying drawing, 1 designates, generally, a fastener inserting machine which in this particular instance is shown as of the portable type, although it will be understood that it may be of any suitable construction. The fastener inserting machine illustrated, except as hereinafter described, is of conventional form, having a shank 2 provided with a head 3 adapted to be struck and having a driver (not shown). The fasteners are guided by a raceway 4, separated by a feeder 5, into the driver passage 6 in the throat 7. This throat may be attached to the machine in the usual manner, as by being threaded therein. The parts so far described may be of any suitable or usual construction.

One side of the throat 7 is cut away, so as to provide a gauge 8 adapted to bear against the work; this leaves the driver passage exposed, as shown. Pivoted at 9 on the throat is a carrier 10, which has a head 11 providing a weight. This head is split to receive a guide 12, which is clamped in the head by a screw 13. It will be noted that the guide is mounted on its carrier below its pivot and extends downwardly into the driver passage. The guide is, therefore, held yieldingly in the driver passage and against the fastener 14 therein. As, however, this fastener is driven, the guide will yield while still supporting the fastener as it is being driven.

One of the uses of the invention is shown in the drawing, in which 15 designates the last, 16 the upper, 17 the insole and 18 the outsole provided with a channel lip 19, while holding elements 20 are provided to hold the turned-over edges of the upper on the insole, as described in the patent referred to. In order to drive a line of fasteners through the outsole and into the lasted upper, the gauging face is positioned against the shoulder formed by the turned-over channel lip. With this construction the fasteners 14 may be driven close to the shoulder while these fasteners are guided during their passage.

While the invention is particularly applicable to the general type of fastener inserting machine specifically shown and described, it will be understood that it is applicable to other forms and types. It will, furthermore, be understood that certain features and sub-combinations are of utility and may be employed without reference to other features and sub-combinations; that is contemplated by and is within the scope of the appended claims. It is further obvious that various changes may be made in details, within the scope of the appended claims, without departing from the spirit of this invention. It is, therefore, to be understood that this invention is not to be limited to the specific details shown and/or described.

Having thus described the invention, what is claimed is:

1. A fastener inserting machine having a throat provided with a passage, a fastener guide extending into said passage and adapted to support a fastener against misalinement during its issuance from said passage, and a weighted carrier therefor pivoted on said throat and adapted to yieldingly hold said guide in said passage.

2. A fastener inserting machine having a throat provided with a passage, a carrier pivoted on and extending laterally from said throat, and a fastener guide mounted on said carrier below its pivot and extending downwardly inclined into said passage.

3. A fastener inserting machine having a throat provided with a passage, one side of said throat being cut away to provide a gauge and expose said passage, a carrier pivoted on said throat, and a fastener guide mounted on said carrier below its pivot and extending into said throat.

4. A fastener inserting machine having a throat provided with a passage, one side of said throat being cut away to provide an exposed gauge face substantially continuous with one side of said passage, and a fastener raceway on the opposite side of said throat to said cut-away portion and leading to said passage.

5. In a fastener inserting device, a throat having a passage adapted to receive a fastener, and means for yieldingly pressing a fastener against one wall of said passage, said passage being cut away to provide a gauge face substantially continuous with the wall of said passage against which the fastener is pressed.

In testimony whereof I affix my signature this 6th day of June, 1928.

PETER MATTLER.